(12) United States Patent
Shake et al.

(10) Patent No.: US 12,379,482 B2
(45) Date of Patent: Aug. 5, 2025

(54) APPARATUS AND METHOD FOR DETECTING, IDENTIFYING AND LOCATING DRONES

(71) Applicant: Raytheon BBN Technologies Corp., Cambridge, MA (US)

(72) Inventors: Tyler Shake, Sykesville, MD (US); Thomas Wilkerson, Baltimore, MD (US); John Dishon, San Diego, CA (US)

(73) Assignee: RTX BBN TECHNOLOGIES, INC., Cambridge, MA (US)

( * ) Notice: Subject to any disclaimer, the term of this patent is extended or adjusted under 35 U.S.C. 154(b) by 290 days.

(21) Appl. No.: 17/833,452

(22) Filed: Jun. 6, 2022

(65) Prior Publication Data
US 2022/0413122 A1    Dec. 29, 2022

Related U.S. Application Data

(60) Provisional application No. 63/214,581, filed on Jun. 24, 2021.

(51) Int. Cl.
G01S 13/76     (2006.01)
(52) U.S. Cl.
CPC ................. *G01S 13/767* (2013.01)
(58) Field of Classification Search
CPC .................. G01S 13/78; G01S 7/41
See application file for complete search history.

(56) References Cited

U.S. PATENT DOCUMENTS

| | | |
|---|---|---|
| 7,464,005 B1 | 12/2008 | Beetner et al. |
| 10,264,440 B2 | 4/2019 | Dishon et al. |
| 10,270,482 B2 | 4/2019 | Dishon et al. |
| 10,291,274 B2 | 5/2019 | Dishon et al. |

(Continued)

FOREIGN PATENT DOCUMENTS

WO    WO-2022271506 A1    12/2022

OTHER PUBLICATIONS

Stagner, Colin, "Detecting and locating electronic devices using their unintended electromagnetic emissions", 2013, Missouri S&T Library and Learning Resources, Doctoral Dissertations, entry 2152, pp. 1-93 (Year: 2013).*

(Continued)

*Primary Examiner* — Vladimir Magloire
*Assistant Examiner* — Eric K Hodac
(74) *Attorney, Agent, or Firm* — CANTOR COLBURN LLP

(57) ABSTRACT

A drone detection, identification and location system and method may illuminate a target with one or multiple selected radio-frequency (RF) carrier frequencies. Both direct emissions received from the target and re-emissions generated by the target may be processed to determine whether the target is a drone. The re-emissions may be generated by circuitry of the target resulting from the illumination with the one or multiple RF carrier frequencies. The re-emissions may comprise cross-modulation products (CMPs) including forced non-linear emissions (FNLEs). The direct emissions and the re-emissions may be processed to generate an RF signature (Continued)

for the target. The target may be determined to be drone and the type of drone may be identified based on the RF signature.

20 Claims, 5 Drawing Sheets

(56) References Cited

U.S. PATENT DOCUMENTS

| | | | |
|---|---|---|---|
| 10,295,593 B2 | 5/2019 | Shake et al. | |
| 11,828,836 B1* | 11/2023 | Dana | B64C 39/024 |
| 2011/0267222 A1* | 11/2011 | Craig | G01S 3/04 |
| | | | 342/28 |
| 2017/0288788 A1* | 10/2017 | Dishon | H04B 1/04 |
| 2017/0289786 A1 | 10/2017 | Dishon et al. | |
| 2019/0086470 A1 | 3/2019 | Shake et al. | |

OTHER PUBLICATIONS

"International Application Serial No. PCT/US2022/033604, International Search Report mailed Oct. 5, 2022", 5 pgs.

"International Application Serial No. PCT/US2022/033604, Written Opinion mailed Oct. 5, 2022", 8 pgs.

Coluccia, Angelo, et al., "Detection and Classification of Multirotor Drones in Radar Sensor Networks: A Review", Sensors, vol. 20, No. 15, (2020), 22 pgs.

Flintoft, Ian, et al., "The Re-emission Spectrum of Digital Hardware Subjected to EMI", IEEE Transactions on Electromagnetic Compatibility, vol. 45, No. 4, (2004), 10 pgs.

Harmon, S, "Analysis of the radar return of micro-UAVs in flight", IEEE Radar Conf., (2017), 6 pgs.

Harmony, R, et al., "Radar Micro-Doppler Feature Extraction Using the Spectrogram and the Cepstrogram", Proceedings of the 11th European Radar Conference, (2014), 4 pgs.

Kim, Byung, et al., "Drone classification using convolutional neural networks with merged Doppler images", IEEE Geosci. Remote Sens. Lett., vol. 14, No. 1, (2017), 5 pgs.

Moses, Allistair, et al., "Radar-based detection and identification for miniature air vehicles", IEEE International Conference on Control Applications (CCA), (2011), 8 pgs.

Nanzer, Jeffrey, et al., "Microwave interferometric and Doppler radar measurements of a Uav", IEEE Radar Conf., (2017), 6 pgs.

Torvik, B, "Classification of birds and UAVs based on radar polarimetry", IEEE Geosci. Remote Sens. Lett, vol. 13, No. 9, (2016), 5 pgs.

Van, Keuk G, et al., "On phased-array radar tracking and parameter control", IEEE Transactions on Aerospace and Electronic Systems, vol. 29, No. 1, (1993), 9 pgs.

* cited by examiner

APPARATUS AND METHOD FOR DETECTING, IDENTIFYING AND LOCATING DRONES

PRIORITY CLAIM

This application claims priority under 35 USC 119 to U.S. Provisional Patent Application Ser. No. 63/214,581, filed Jun. 24, 2021 [reference number 3547.056PRV (21-15183-US-PSP)] which is incorporated herein by reference in its entirety.

TECHNICAL FIELD

Embodiments pertain to drone detection, drone identification and drone location. Some embodiments pertain to radio-frequency (RF) signatures. Some embodiments pertain to forced non-linear emissions (FNLEs).

BACKGROUND

Unmanned aerial vehicles (UAVs), better known as drones, are one of the technological marvels of our age. The proliferation of drones, particularly smaller drones, has created many problems. For example, growing number of drones have been flown dangerously close to commercial aircraft, violating federal rules about their operation. Drones are difficult to detect and difficult to distinguish from other objects (e.g., birds). Furthermore, the location of a drone is difficult to determine.

Thus there are general needs for systems and methods for detecting, identifying, and locating drones, particularly small form-factor drones.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A drone detection, identification and location system and method are described herein. The drone detection, identification and location system and method may illuminate a target with one or multiple selected radio-frequency (RF) carrier frequencies. Both direct emissions received from the target and re-emissions generated by the target may be processed to determine whether the target is a drone, to identify the drone, and to locate the drone. The re-emissions may be generated by circuitry of the target resulting from the illumination with the one or multiple RF carrier frequencies. The re-emissions may comprise cross-modulation products (CMPs) including forced non-linear emissions (FNLEs). In some embodiments, the direct emissions and the re-emissions may be processed to generate an RF signature for the target. The target may be determined to be drone and the type of drone may be identified based on the RF signature. These embodiments as well as other are described in more detail below.

Figure 1:
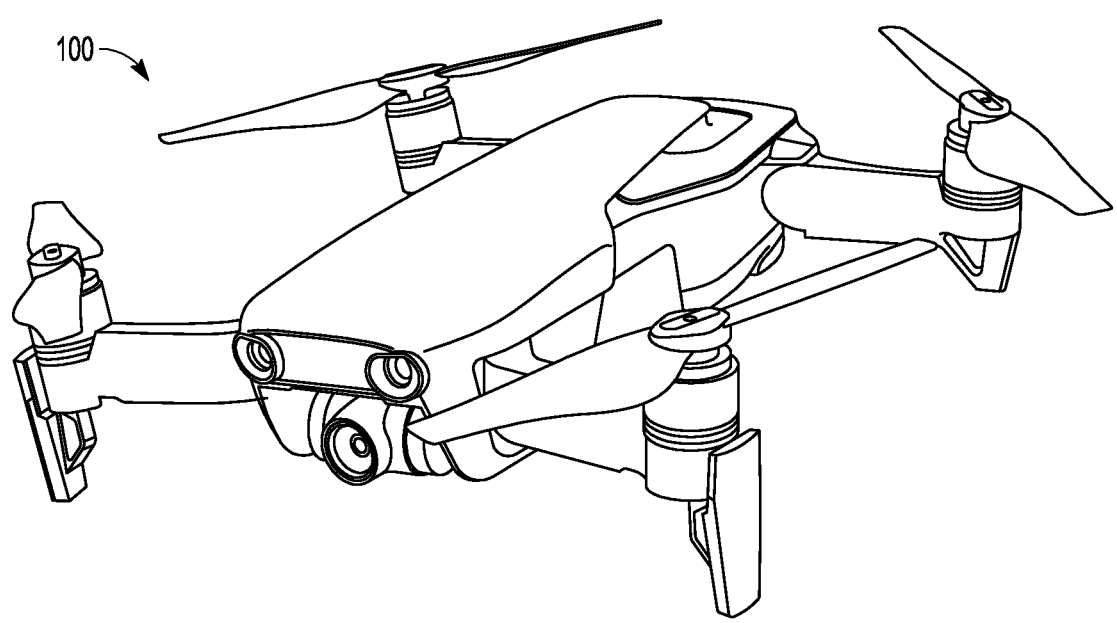
FIG. 1 illustrates an example of drone, in accordance with some embodiments.

FIG. 1 illustrates an example of drone, in accordance with some embodiments. Drone 100 may be an unmanned aerial vehicle (UAV) and when operating, may be controlled by a remotely-located operator. Drone 100 may include various active and passive circuitry, including communication antennas, as well as structural elements, which may generate direct emissions and re-emissions used for drone detecting, identifying and/or locating as described here. These embodiments are described in more detail below.

Figure 2:
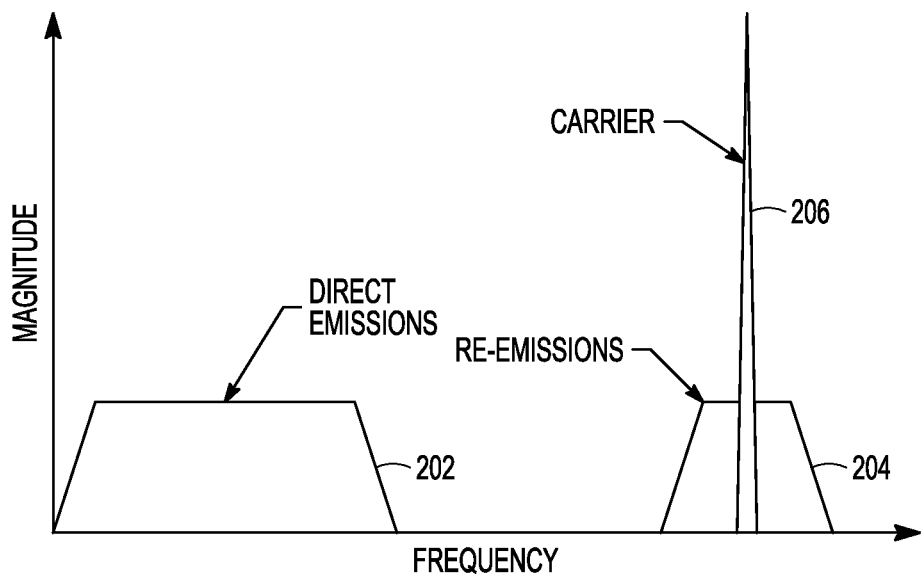
FIG. 2 illustrates an example frequency spectrum, in accordance with some embodiments.

FIG. 2 illustrates an example frequency spectrum, in accordance with some embodiments. As illustrated in FIG. 2, the frequency spectrum includes direct emissions 202 from the drone as well as re-emissions 204 from the drone. The re-emissions 204 may be generated by circuitry of the target resulting from the illumination with selected one or multiple RF carrier frequencies 206.

Figure 3:
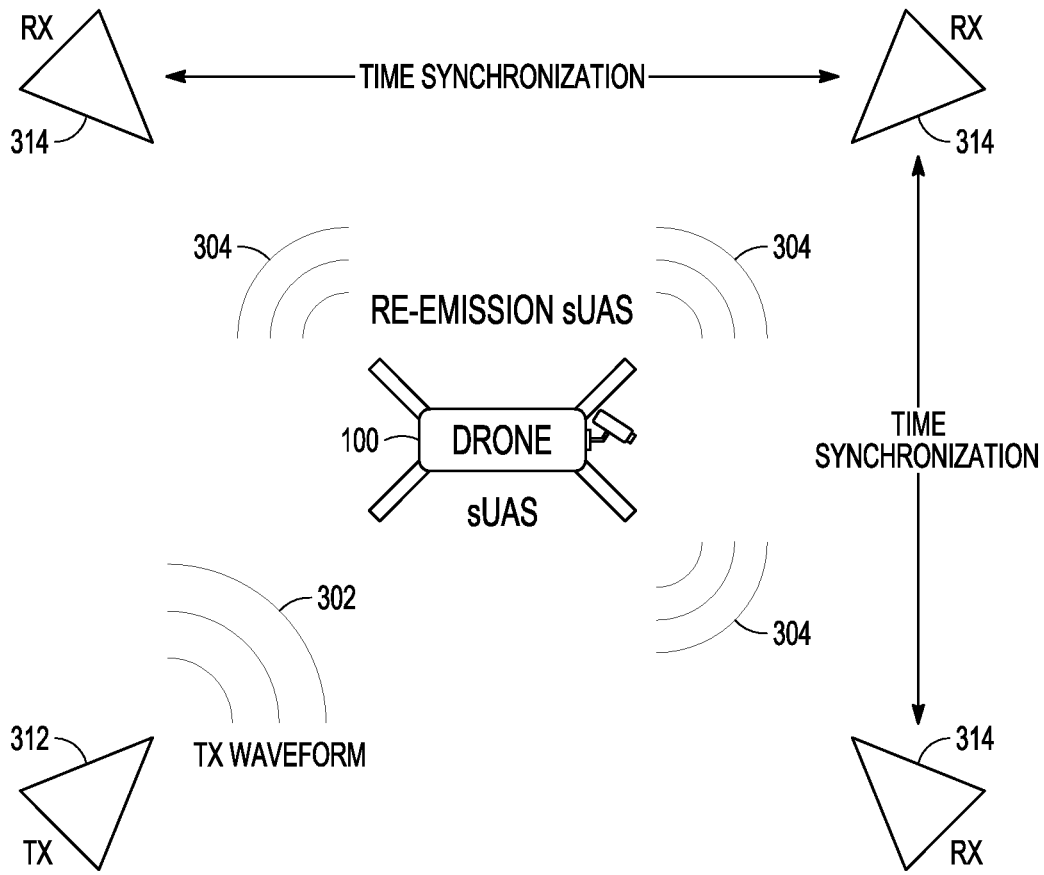
FIG. 3 illustrates an example of drone detection, in accordance with some embodiments.

FIG. 3 illustrates an example of drone detection, in accordance with some embodiments. Drone 100 may be illuminated by a transmit waveform 302 comprising the selected one or multiple RF carrier frequencies 206 (FIG. 2). Emissions as well as re-emissions 304 generated by the drone 100 may be detected and processed for drone detection, identification and/or geo-location as described herein. As illustrated in FIG. 3, one or more transmit antennas 312 may be used for the transmission of the one or multiple RF carrier frequencies. One or more receive antennas 314 may be used to receive the emissions and re-emissions. In some embodiments, the one or more receive antennas 314 may receive cross-modulation product (CMP) return signals re-emitted by the target, although the scope of the embodiments is not limited in this respect. These embodiments are described in more detail below.

In some embodiments, an apparatus, method, and computer program product is disclosed for drone detecting, identifying, and/or locating. A target device may be intentionally illuminated with electromagnetic energy selected to have specific characteristics (e.g., frequency, power, waveform, directionality, duration, etc.) described herein. The target device, which may be drone, may act as a non-linear mixer and may be forced to emit radiative signals containing information about the target device behavior, state, and physical characteristics. In some embodiments, the forced emissions may be received and useful data may be extracted and analyzed to determine target device characteristics (e.g., a drone type, based on a comparison of data from known drone types). In some embodiments, the illumination may be controlled so the forced emissions radiate without interfering with the drone's communications. In some embodiments, a drone can be located via the strength and directionality of the forced emissions.

In some embodiments, a drone detection, identification, and location system is disclosed that may comprise a software defined radio (SDR) that may be configured for remote detection and analysis of a drone. In some of these embodiments, the SDR may include transmitter circuitry configured to illuminate the target device with electromagnetic energy configured to stimulate electromagnetic signals in the target device. The stimulated electromagnetic signals in the target device may be configured to mix with the electromagnetic energy to produce forced non-linear emissions (FNLE) that radiate from the target device. The SDR may also include receiver circuitry configured to receive the forced non-linear emissions from the target device and processing circuitry to determine whether the target devices is a drone, based on the received FNLE. The processing circuitry may also determine a drone type from among known drone types by comparing a reference evaluation of a reference device of known type using, among other things, FNLE profiles of the reference device.

Figure 4:
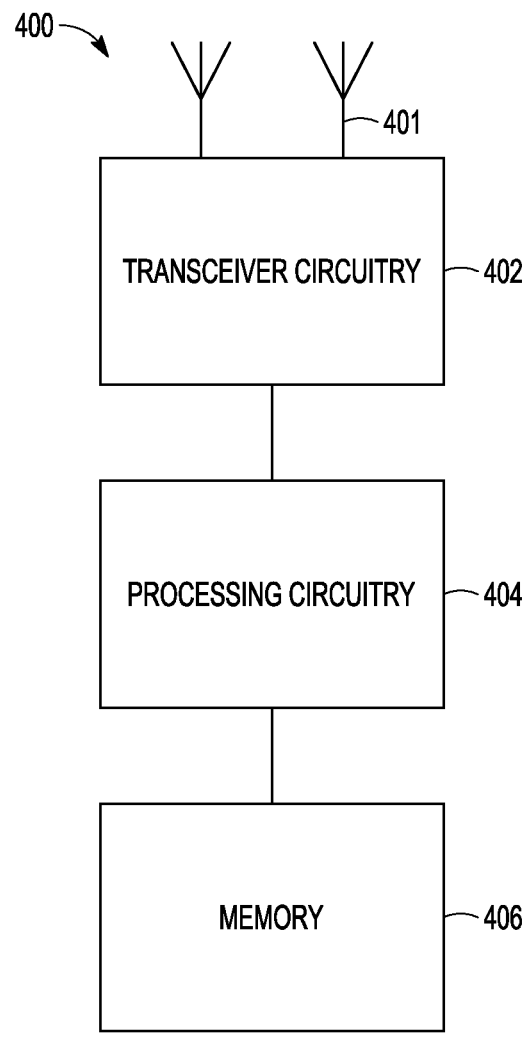
FIG. 4 illustrates a drone detecting, identifying, and locating system, in accordance with some embodiments.

FIG. 4 illustrates a drone detecting, identifying, and locating system, in accordance with some embodiments. Drone detecting, identifying, and locating system 400 may include, among other things, transceiver circuitry 402, processing circuitry 404, and memory 406. Drone detecting, identifying, and locating system 400 may also include one or more antennas 401 coupled to transceiver circuitry 402. Antennas may include separate transmit and receive antennas although this is not a requirement as antennas may be use for both transmit and receive operations. In some embodiments, drone detecting, identifying, and locating system 400 may be a SDR.

Some embodiments are directed to an apparatus for drone detection, identification and location, such as drone detecting, identifying and locating system 400 (FIG. 4). The apparatus may comprise, for example, processing circuitry 402; and memory 406. For drone identification and detection, the processing circuitry 402 may configure transceiver circuitry 402 to illuminate a target with one or multiple radio-frequency (RF) carrier frequencies. The processing circuitry 402 may process both direct emissions received from the target and re-emissions generated by the target to determine whether the target is a drone. In these embodiments, the re-emissions may be generated by circuitry of the target resulting from the illumination with the one or multiple RF carrier frequencies. In some embodiments, the re-emissions may be generated by active circuitry of the target, although this is not a requirement as re-emissions may also be generated by non-active/passive circuit components of target.

In some embodiments, the re-emissions may comprise cross-modulation products (CMPs) which may be caused from a mixing of the one or multiple RF carrier frequencies with signals present on the circuitry of the target. In these embodiments, the processing circuitry 402 may process the direct emissions and the re-emissions to generate an RF signature for the target and may determine whether the target is a drone based on the RF signature. In these embodiments, drones, including small form-factor drones, may be identified based on their RF signature.

In some embodiments, the CMPs may include forced non-linear emissions (FNLEs) generated by the target. In these embodiments, the one or multiple RF carrier frequencies may be selected to cause circuitry of the target to produce the FNLEs. In these embodiments, the processing circuitry 402 may process frequency, amplitude and/or phase characteristics of the direct emissions and the re-emissions to generate the RF signature for the target.

In some embodiments, the one or multiple carrier frequencies are selected to be at or near antenna frequencies of the target. In these embodiments, the antenna frequencies may include frequencies used by the target for communication.

In some embodiments, the direct emissions comprise emissions from at least a clock signal of the circuitry of the target. In these embodiments, the CMPs may comprise a mixing product of the clock signal and one of the RF carrier frequencies. In these embodiments, the clock signal may be generated by circuitry on the target based on a crystal oscillator, which may produce at least some of the direct emissions. In these embodiments, a particular RF carrier frequency may be selected so that the drone circuitry generates a FNLE based on the clock signal or the direct emissions of the crystal oscillator.

In some embodiments, the direct emissions of the target may further include RF emissions from one or more busses of the circuitry of the target and RF emissions from switching of control circuitry of the target. In these embodiments, the CMPs may be generated by the target from a mixing of the one or multiple RF carrier frequencies with the RF emissions from the one or more busses and the RF emissions from the control circuitry. In these embodiments, direct emissions from data busses such as I2C or SPI, memory busses such as those that interface with DRAM, storage busses such as SATA, and switching caused by voltage control circuitry may be used to generate CMPs to help identify whether the target is a drone and identify the type of drone.

In some embodiments, the memory 406 is configured to store a plurality of RF signatures of known drone types. In some embodiments, each signature may be associated with CMPs for one or more different types of drones for one or more of the multiple carrier frequencies and direct-emission characteristics for the one or more different types of drones. In these embodiments, the processing circuitry 402 may compare the RF signature generated from the direct emissions and the re-emissions with the RF signatures stored in the memory 406 to determine whether to classify the target as a drone or something other than a drone and to determine a type of drone (e.g., make and model) when classified as a drone. In these embodiments, because different types of drones produce different direct emission characteristics as well as different re-emissions, each type of drone may have a unique RF signature. In some of these embodiments, different signatures may be associated with different drone makes and models allowing the make and model of a drone to be identified based on its signature.

It should be noted that different carrier frequencies may produce different re-emissions and that some carrier frequencies may produce little or no emissions. Accordingly, the use of different carrier frequencies may result in different RF signature characteristics. Embodiments disclosed herein provide for the selection and use of different carrier frequencies to produce different RF signature characteristics to allow the make and model of a drone to be identified.

In some embodiments, the processing circuitry 402 may be configured to identify the target as a non-drone device based on the direct emissions and the re-emissions. In these embodiments, the processing circuitry 402 may also be configured to identify the target as a non-electronic flying object (e.g., birds) based on a lack of re-emissions. In these embodiments, other electronic devices which produce CMPs based on their circuit assemblies may have different characteristics in terms of their frequency, amplitude, and phase responses than drone devices and may be identified as non-drone devices.

In some embodiments, the processing circuitry 402 may configure the transceiver circuitry 402 to transmit a set of the multiple RF carrier frequencies. In these embodiments, the processing circuitry 402 may process the CMPs generated from the set of multiple RF carrier frequencies along with the direct emissions to generate the RF signature for the target. In some of these embodiments, a particular set of RF carrier frequencies may be selected based on the type of drone to be detected. In some embodiments, to process the CMPs, the processing circuitry 402 may apply one or more matched filters designed by known reference signals.

In some embodiments, the processing circuitry 402 may be configured to determine a geo-location of the target comprising a range and an angle by processing the CMPs generated by the target caused by illumination of the target comprising the one or multiple carrier frequencies. In these embodiments, a single receiver and/or receive antenna may be used for geo-location, although the scope of the embodiments is not limited in this respect.

In some embodiments, the processing circuitry 402 may also be configured to determine the geo-location of the target by processing the direct emissions, the re-emissions, and/or CMP return signals re-emitted by the target caused by illumination of the target with a pulse comprising the one or multiple carrier frequencies. In these embodiments, small form-factor drones which may be difficult to detect by conventional radar because they generate lower level returns, may be detected based on a combination of their skin returns and the non-linear emissions (e.g., using CMP radar techniques). In these embodiments, drones, including small form-factor drones, may be distinguished from larger drones and aircraft based on their size and/or speed which may be determined from the return signals. In these embodiments, after detection of an illumination frequency and CMP frequency (i.e., after transmission of the multiple carrier frequencies) the processing circuitry 402 may shift to a mono-frequency illumination pulse and a tight window on the return CMP signal, although the scope of the embodiments is not limited in this respect.

In some embodiments, the direct emissions may comprise RF signals within a first spectrum 202 (FIG. 2) and the re-emissions comprise RF signals with a second spectrum 204 (FIG. 2). In these embodiments, the one or multiple carrier frequencies 206 may be within the second spectrum 204. In some embodiments, the direct emissions may range from 1 MHz to 100 MHz and the re-emissions may range from 100 MHz to 4 GHz, although the scope of the embodiments is not limited in this respect.

In some embodiments, the transceiver circuitry 402 may be coupled to one or more directional antennas 401 for transmission of the one or multiple RF carrier frequencies in a direction of the target. In these embodiments, the transceiver circuitry 402 may also be coupled to an array of receive antennas to receive the signals from the target including the direct emissions, the re-emissions and/or the return signals. In these embodiments, at least one of the receive antennas may be configured to receive the direct emissions and re-emissions (see FIG. 3 for example).

In some embodiments, the processing circuitry 402 may also be configured to cause the transceiver circuitry 402 to scan an area with the one or multiple RF carrier frequencies to detect targets in the area based on re-emissions received through the array of receive antennas. In some embodiments, a power level for the one or multiple carrier frequencies may be selected based on the range to the target to minimize and/or reduce interference without disrupting operation of the target. In these embodiments, the power level may be selected to minimize non-linear emissions from the target. In some embodiments, if the target is identified as a drone and the drone is considered a threat, the power level of the one or multiple carrier frequencies may be increased to disrupt operation of the drone, although the scope of the embodiments is not limited in this respect.

In some embodiments, the apparatus may comprise a software-defined radio (SDR), although the scope of the embodiments is not limited in this respect.

Some embodiments are directed to a method for drone detection comprising illuminating a target with one or multiple radio-frequency (RF) carrier frequencies and processing direct emissions received from the target and re-emissions generated by the target to determine whether the target is a drone. These embodiments are described in more detail below.

Some embodiments are directed to a non-transitory computer-readable storage medium that stores instructions for execution by processing circuitry 402 configured for drone detection, identification and/or location. In these embodiments, the processing circuitry 402 may configure transceiver circuitry 402 to illuminate a target with one or multiple radio-frequency (RF) carrier frequencies and may process both direct emissions received from the target and re-emissions generated by the target to determine whether the target is a drone.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 5:
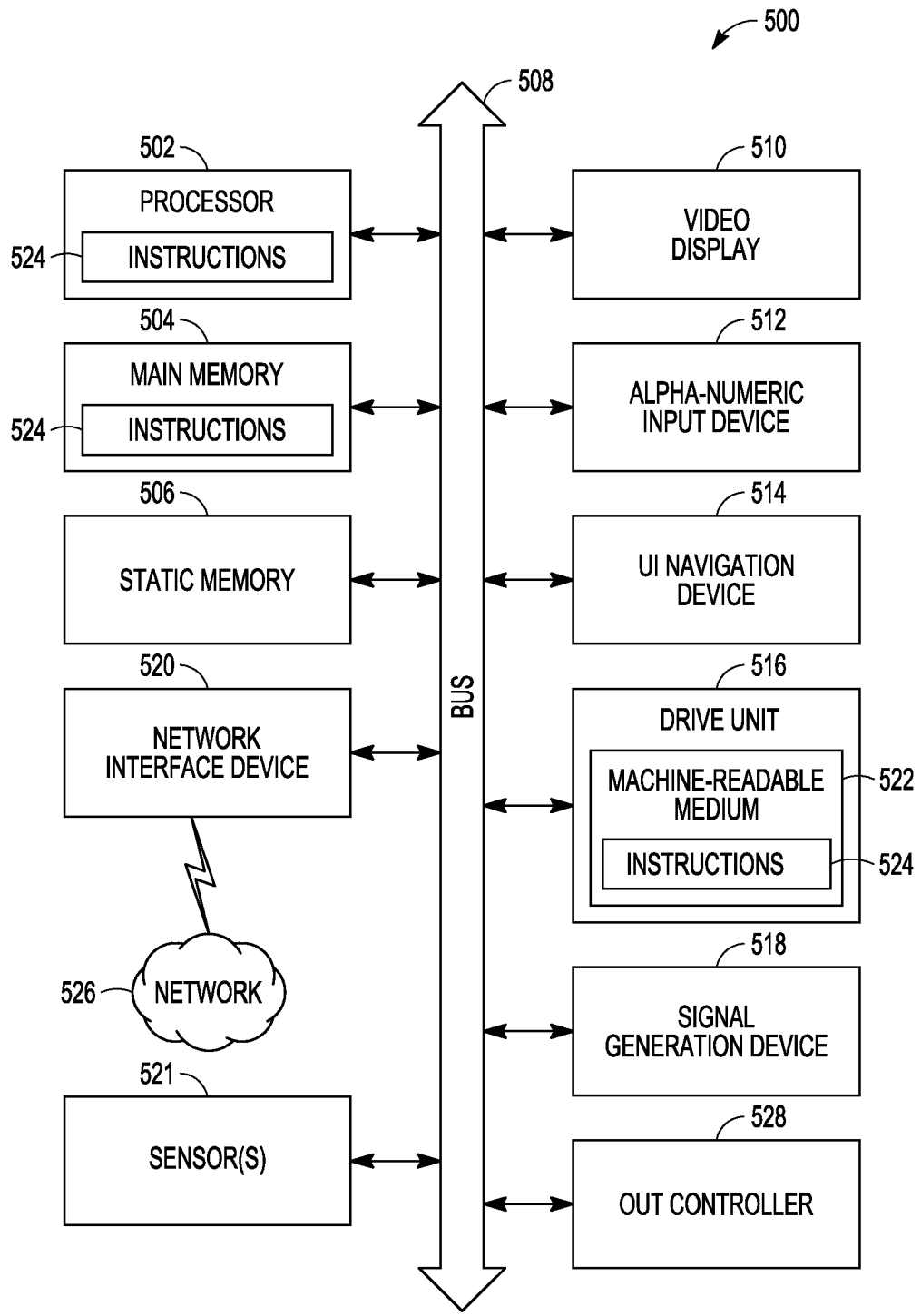
FIG. 5 illustrates a block diagram of an example machine, in accordance with some embodiments.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a non-transitory computer-readable storage medium. In an example, the software, when executed by the underlying hardware of the module, causes the hardware to perform the specified operations. In some embodiments, the non-transitory computer-readable storage medium may store instructions for execution by one or more processors or processing circuitry, to perform the operations described herein.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include processing circuitry such as a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

Figure 6:
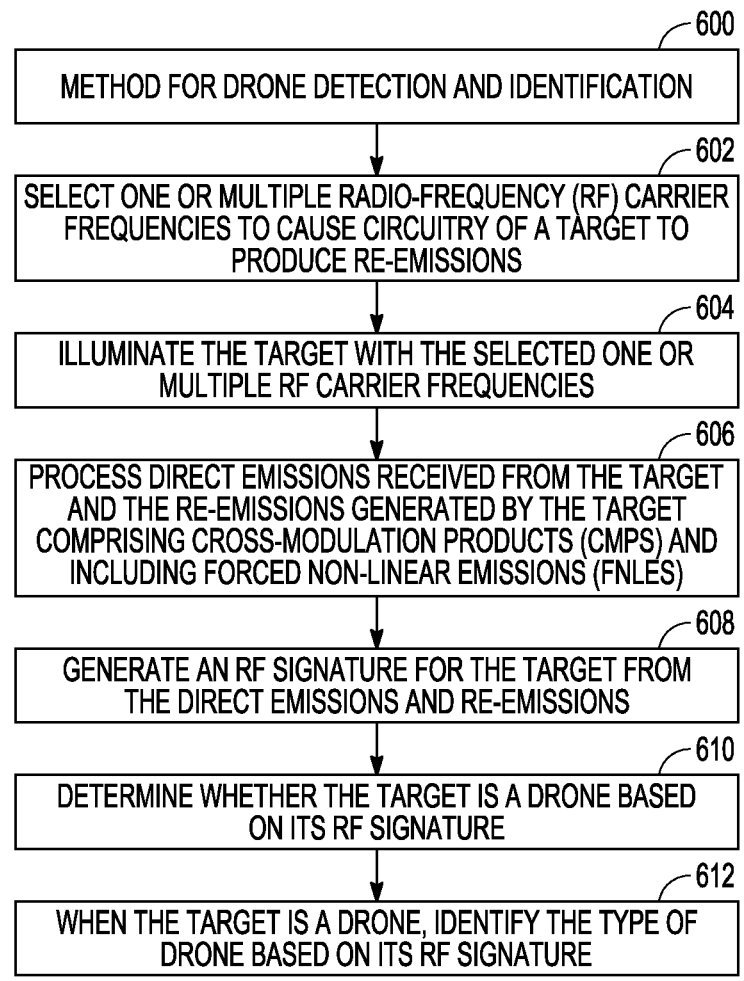
FIG. 6 is a flow chart describing a procedure 600 for drone detection, identification and location, in accordance with some embodiments.

FIG. 6 is a flow chart describing a procedure 600 for drone detection, identification and location, in accordance with some embodiments. Procedure 600 may be performed by processing circuitry and memory of an apparatus for drone detection, identification and location, although this is not a requirement as other devices may be used.

Operation 602 comprises selection of one or multiple radio-frequency (RF) carrier frequencies to cause circuitry of a target to produce re-emissions.

Operation 604 comprises illumination of the target with the selected one or multiple RF carrier frequencies. Operation 606 comprises processing direct emissions received from the target and the re-emissions generated by the target. The re-emissions may comprise cross-modulation products (CMPs) and including forced non-linear emissions (FNLEs).

Operation 608 comprises generating an RF signature for the target from the direct emissions and re-emissions. Operation 610 comprising determining whether the target is a drone based on its RF signature. Operation 612 comprises, when the target is a drone, identifying the type of drone based on its RF signature. In some embodiments, procedure 600 may also include determining the location of the drone as described above.

The following US patents are incorporated herein by reference:

U.S. Ser. No. 10/264,440 entitled "Apparatus and method for rapid electronic device discovery"

U.S. Ser. No. 10/291,274 entitled "Apparatus and method for remote analysis of a target device"

U.S. Ser. No. 10/270,482 entitled "Automated avionics testing"

U.S. Ser. No. 10/295,593 entitled "Operating general purpose hardware as radio"

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for drone detection, identification and location, the apparatus comprising: processing circuitry; and memory, wherein the processing circuitry is to:
   configure transceiver circuitry to illuminate a target with one or multiple radio-frequency (RF) carrier frequencies; and
   process direct emissions received from the target and re-emissions generated by the target to generate an RF signature for the target and determine, based on the RF signature, whether the target is a drone,
   wherein the re-emissions are generated by circuitry of the target resulting from the illumination with the one or multiple RF carrier frequencies.

2. The apparatus of claim 1, wherein the re-emissions comprise cross-modulation products (CMPs) caused from a mixing of the one or multiple RF carrier frequencies with signals present on the circuitry of the target.

3. The apparatus of claim 2, wherein the CMPs include forced non-linear emissions (FNLEs) generated by the target,
   wherein the one or multiple RF carrier frequencies are selected to cause circuitry of the target to produce the FNLEs, and
   wherein the processing circuitry is configured to process frequency, amplitude and phase characteristics of the direct emissions and the re-emissions to generate the RF signature for the target.

4. The apparatus of claim 3, wherein the one or multiple carrier frequencies are selected to be at or near antenna frequencies of the target.

5. The apparatus of claim 3, wherein the direct emissions comprise emissions from a clock signal of the circuitry of the target, and
   wherein the CMPs comprise a product of the clock signal and one of the RF carrier frequencies.

6. The apparatus of claim 5, wherein the direct emissions of the target further include RF emissions from one or more busses of the circuitry of the target and RF emissions from switching of control circuitry of the target; and
   wherein the CMPs are generated from a mixing of the one or multiple RF carrier frequencies with the RF emissions from the one or more busses and the RF emissions from the control circuitry.

7. The apparatus of claim 5, wherein the memory is configured to store a plurality of RF signatures of known drone types, each signature associated with:
   CMPs for one or more different types of drones for one or more of the multiple carrier frequencies, and
   direct-emission characteristics for the one or more different types of drones, wherein the processing circuitry is configured to:
   compare the RF signature generated from the direct emissions and the re-emissions with the RF signatures stored in the memory to determine whether the target as a drone and to determine a type of drone.

8. The apparatus of claim 7, wherein the processing circuitry is to configure the transceiver circuitry to transmit a set of the multiple RF carrier frequencies, and
   wherein the processing circuitry is to process the CMPs generated from the set of multiple RF carrier frequencies along with the direct emissions to generate the RF signature for the target.

9. The apparatus of claim 8, wherein to process the CMPs, the processing circuitry is configured to apply one or more matched filters.

10. The apparatus of claim 7, wherein the processing circuitry is further configured to determine a geo-location of the target comprising a range and an angle by processing the CMPs generated by the target caused by illumination of the target comprising the one or multiple carrier frequencies.

11. The apparatus of claim 10, wherein the processing circuitry is further configured to determine the geo-location of the target by processing the direct emissions, the re-emissions, and CMP return signals re-emitted by the target caused by illumination of the target with a pulse comprising the one or multiple carrier frequencies.

12. The apparatus of claim 11, wherein after receiving the direct emissions received and re-emissions, and after receipt of the CMP return signal, the processing circuitry is configured to configure the transceiver circuitry to shift to transmission of a mono-frequency illumination pulse and a predetermined window based on the CMP return signal.

13. The apparatus of claim 11, wherein the direct emissions comprise RF signals within a first spectrum and the re-emissions comprise RF signals with a second spectrum, the one or multiple carrier frequencies being within the second spectrum.

14. The apparatus of claim 13, wherein the transceiver circuitry is configured to be coupled to one or more directional antennas for transmission of the one or multiple RF carrier frequencies in a direction of the target, and
   wherein the transceiver circuitry is configured to be coupled to an array of receive antennas to receive the signals from the target including the direct emissions, the re-emissions and the return signals,
   wherein at least one of the receive antennas is configured to receive the direct emissions and re-emissions.

15. The apparatus of claim 14, wherein the processing circuitry is further configured to cause the transceiver circuitry to scan an area with the one or multiple RF carrier frequencies to detect targets in the area based on re-emissions received through the array of receive antennas.

16. The apparatus of claim 3, wherein the apparatus comprises a software-defined radio (SDR).

17. A method for drone detection comprising:
   illuminating a target with one or multiple radio-frequency (RF) carrier frequencies; and
   processing direct emissions received from the target and re-emissions generated by the target to generate an RF signature for the target and determine, based on the RF signature, whether the target is a drone,
   wherein the re-emissions are generated by circuitry of the target resulting from the illumination with the one or multiple RF carrier frequencies,
   wherein the re-emissions comprise cross-modulation products (CMPs) caused from a mixing of the one or multiple RF carrier frequencies with signals present on the circuitry of the target.

18. The method of claim 17, wherein the CMPs include forced non-linear emissions (FNLEs) generated by the target,
   wherein the method further comprises selecting the one or multiple RF carrier frequencies to cause circuitry of the target to produce the FNLEs, and wherein the processing circuitry is configured to process frequency, amplitude and phase characteristics of the direct emissions and the re-emissions to generate the RF signature for the target.

19. The method of claim 18, further comprising determining a geo-location of the target comprising a range and an angle by processing the CMPs generated by the target caused by illumination of the target comprising the one or multiple carrier frequencies.

20. A non-transitory computer-readable storage medium that stores instructions for execution by processing circuitry, wherein for drone detection, the processing circuitry is configured to:
- configure transceiver circuitry to illuminate a target with one or multiple radio-frequency (RF) carrier frequencies; and
- process direct emissions received from the target and re-emissions generated by the target to generate an RF signature for the target and determine, based on the RF signature, whether the target is a drone,
- wherein the re-emissions are generated by circuitry of the target resulting from the illumination with the one or multiple RF carrier frequencies.

* * * * *